Figure 1:
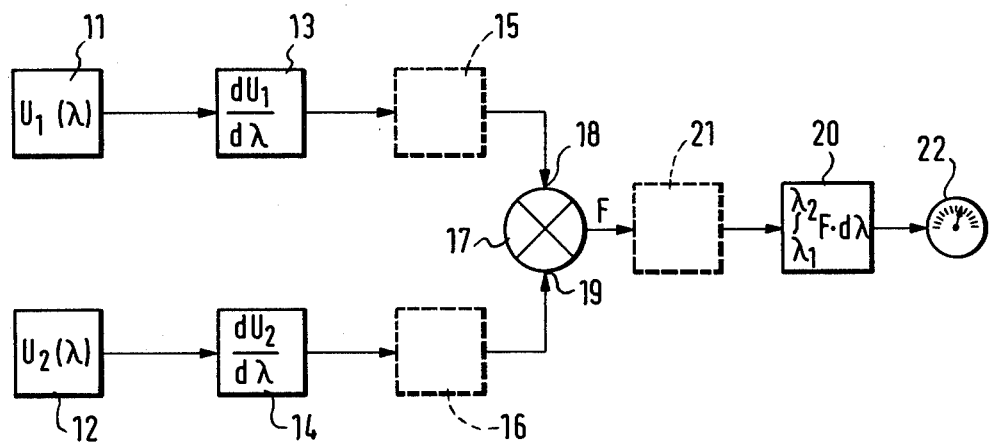

United States Patent [19]
Krause

[11] 4,449,819
[45] May 22, 1984

[54] ARRANGEMENT FOR DETERMINING THE CONCENTRATION OF A SUBSTANCE IN A MIXTURE OF SUBSTANCES

[75] Inventor: Gerhard Krause, Rosenheim, Fed. Rep. of Germany

[73] Assignee: Erwin Sick GmbH Optik-Elektronik, Fed. Rep. of Germany

[21] Appl. No.: 288,280

[22] Filed: Jul. 30, 1981

[30] Foreign Application Priority Data

Aug. 7, 1980 [DE] Fed. Rep. of Germany ....... 3029945

[51] Int. Cl.$^3$ .............................................. G01J 3/00
[52] U.S. Cl. ................................... 356/300; 356/326
[58] Field of Search ............... 356/319, 326, 328, 402, 356/300; 364/498, 526

[56] References Cited

U.S. PATENT DOCUMENTS 3,893,770  7/1975  Takami et al. ...................... 356/328

Primary Examiner—F. L. Evans
Attorney, Agent, or Firm—Townsend and Townsend

[57] ABSTRACT

A mixture of substances is analyzed by spectral analysis to establish the concentration of one component of the mixture. For this purpose signals $U_1(\lambda)$ representative of the spectrum of the substance under investigation and $U_2(\lambda)$ representative of the spectrum of the mixture of substances are manipulated electronically so as to remove the effects of cross-sensitivity and to yield an accurate value for the concentration of the substance in the mixture of substances. This concentration is normally difficult to determine because of the effects of cross-sensitivity, i.e. because other components in the mixture of substances have similar spectral lines to those of the substance under investigation. In one arrangement the two signals $U_1(\lambda)$ and $U_2(\lambda)$ are first differentiated in respective differentiating stages 13 and 14 and the differentiated signals are multiplied in a multiplier 17. The output signal from the multiplier is subsequently integrated in an integrator 20 and the output of the integration is a measure of the concentration of the substance under investigation. The signal F derived from the multiplier 17 has two components $F_N+F_S$. The component $F_N$ is a product of the wanted signal in respect of the substance under investigation from the reference source 11 and of the wanted component from the measured signal $U_2(\lambda)$. This product is always positive and thus leads to a maximum value at the output of the integrator. The component $F_S$ is equivalent to a product of the wanted signal from the reference source with unwanted signals from the measurement and is in fact a value which statistically flucutates about zero. The result of integrating this component is thus a value which approximates to zero. In other words the result of the integration provides exclusively information about the substance under investigation.

28 Claims, 27 Drawing Figures

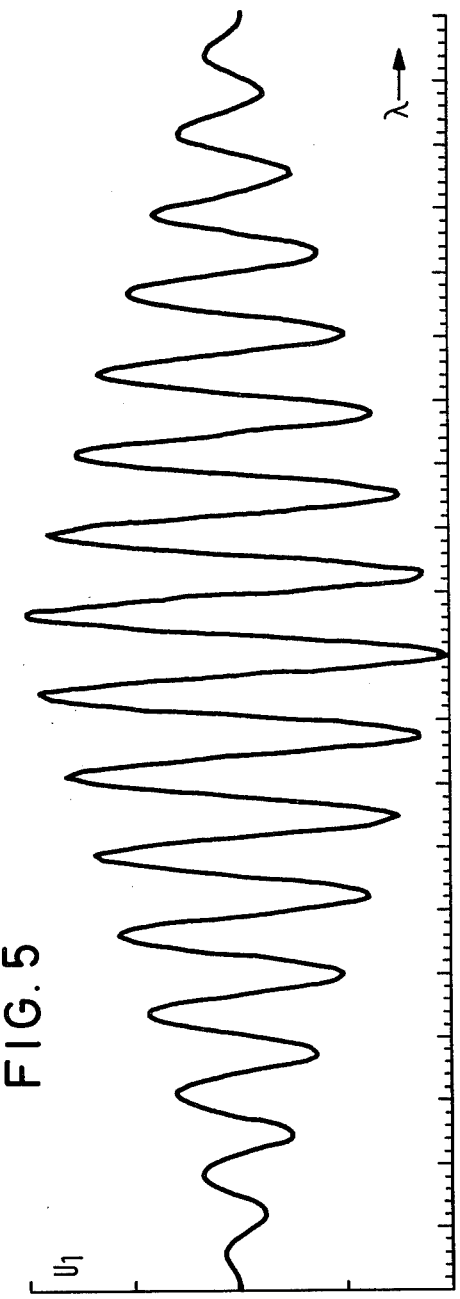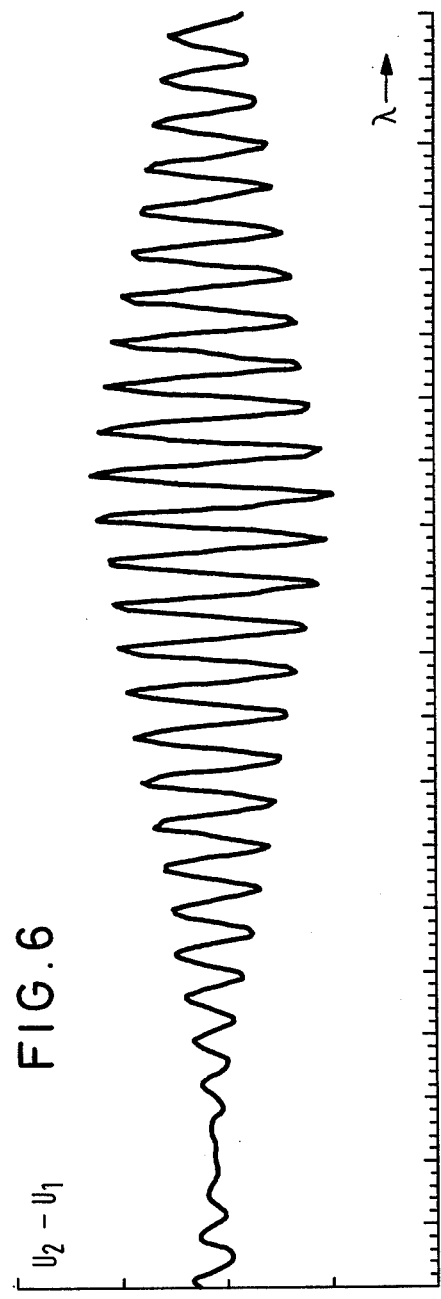

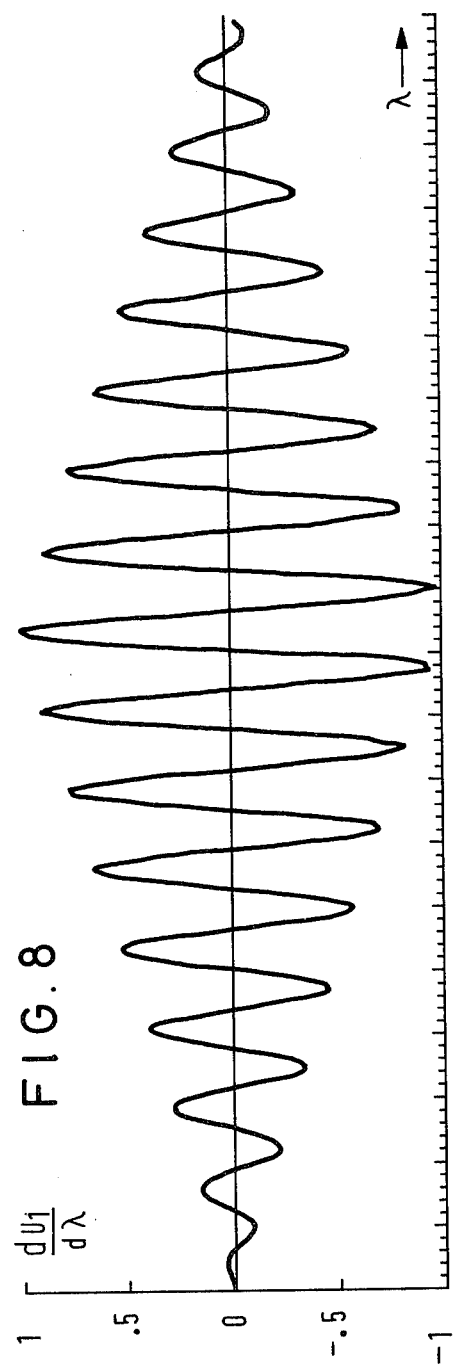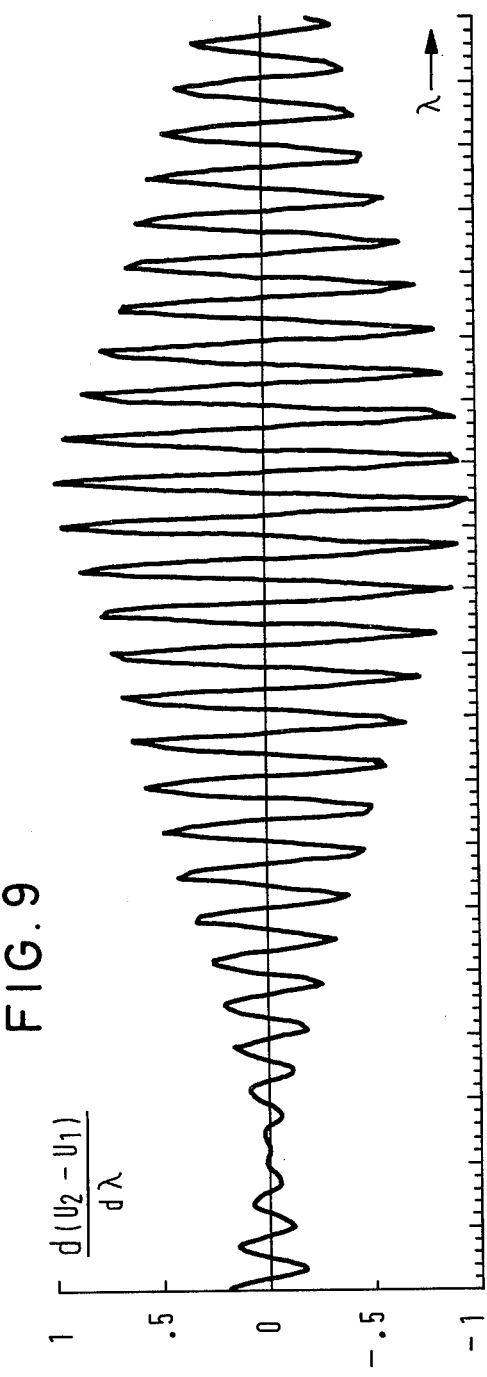

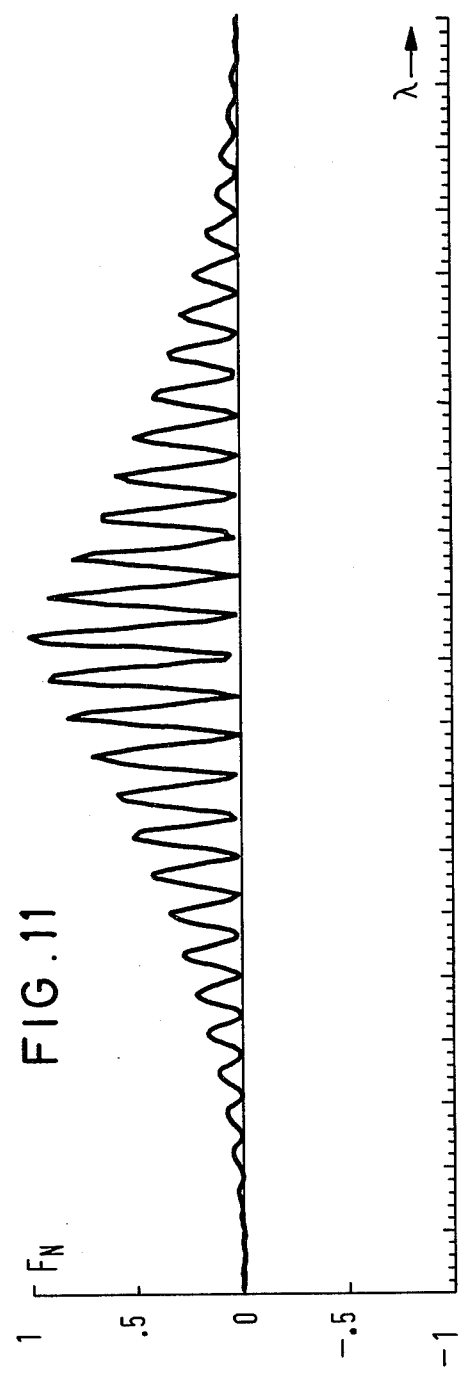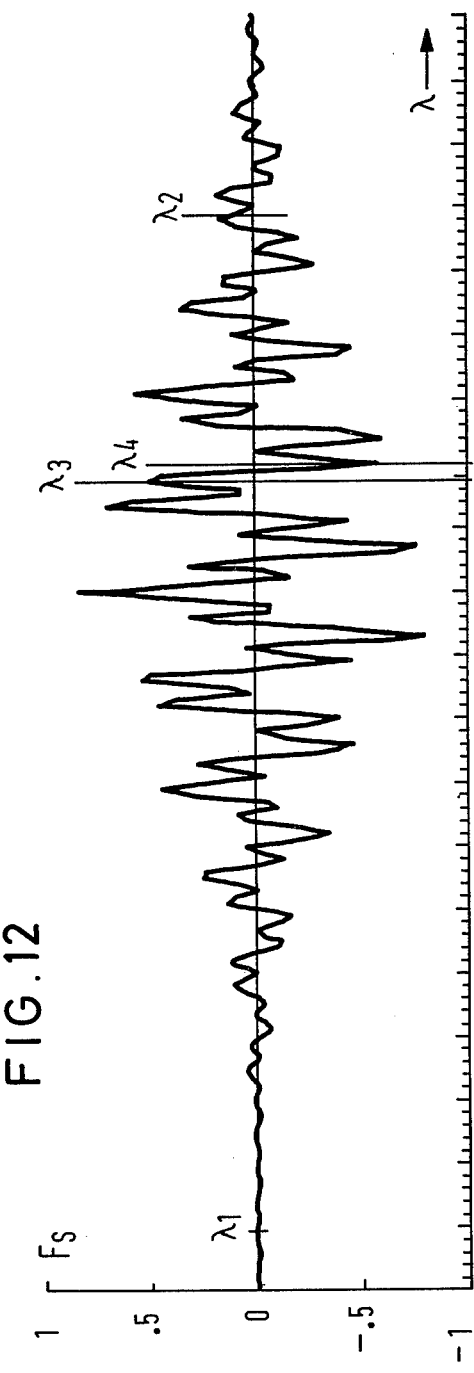

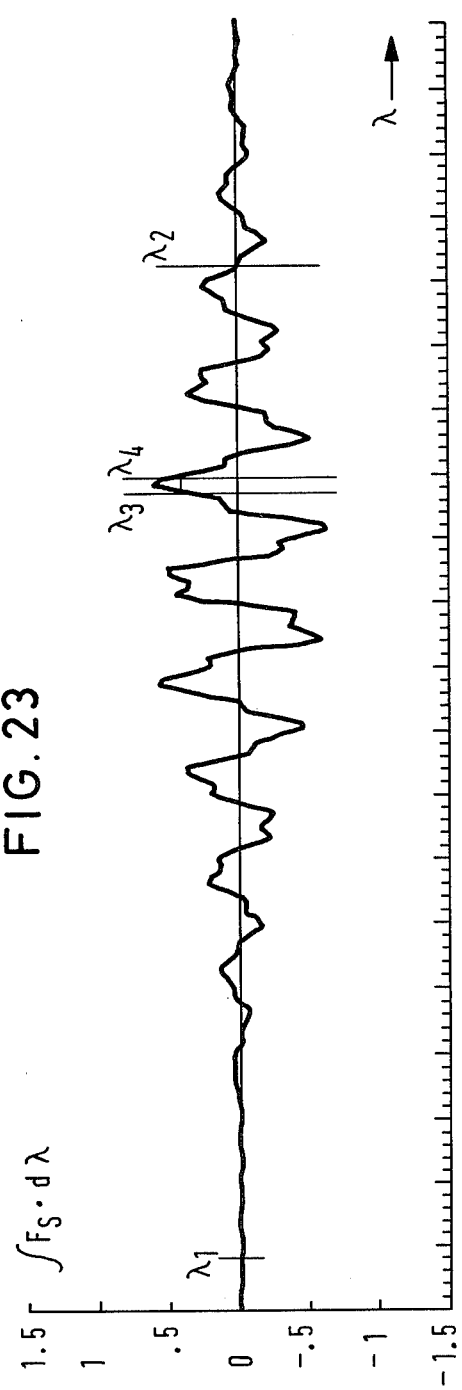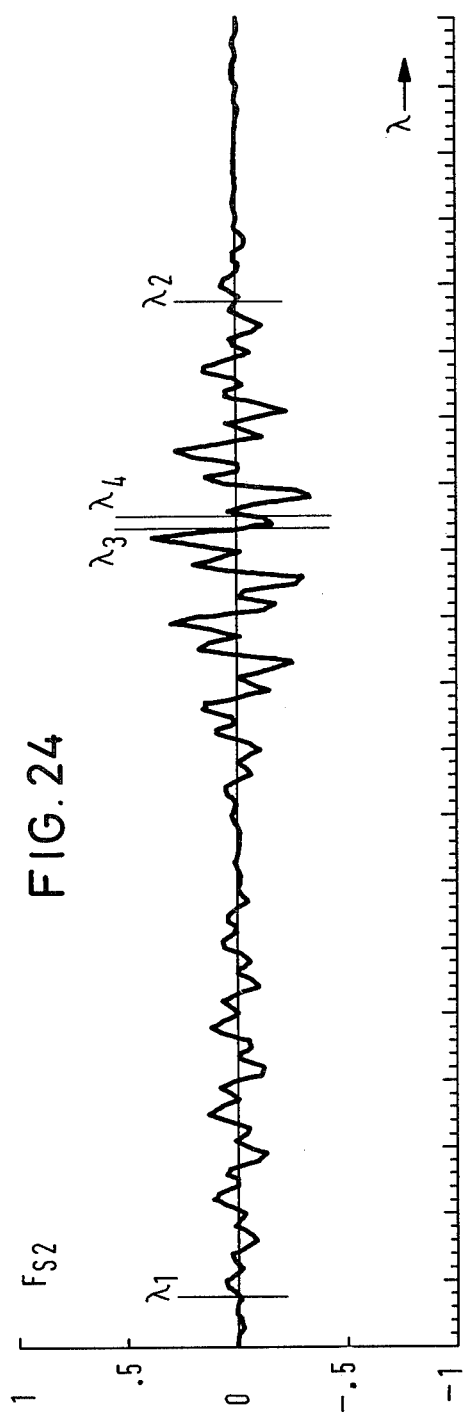

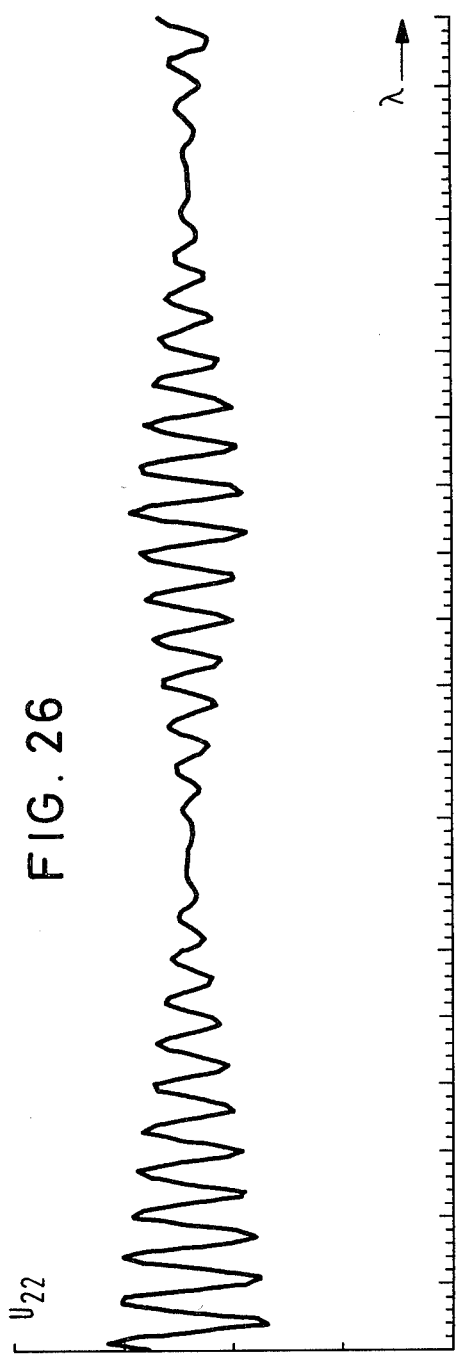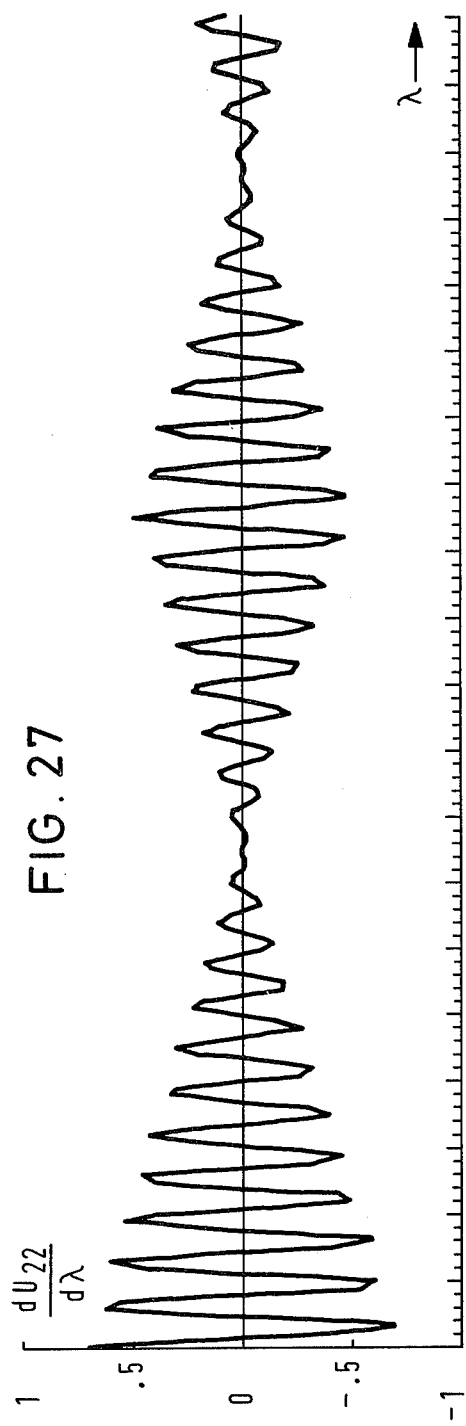

ARRANGEMENT FOR DETERMINING THE CONCENTRATION OF A SUBSTANCE IN A MIXTURE OF SUBSTANCES

The invention relates to an arrangement for determining the concentration, or a value functionally related thereto of a substance present in a mixture of substances, wherein the optical spectrum of the mixture of substances, or a transformed function of this spectrum is measured, and is compared with an available reference spectrum of the substance or a transformed function of this reference spectrum, respectively and wherein the concentration, or the functionally related value, is determined from the comparison.

A significant problem arises with arrangements of this kind in as much as other substances present in the mixture of substances can affect the measurement of the concentration of the substance under investigation. By way of example, unwanted components in the mixture of substances can have absorption lines or bands at the same wavelength as the substance under investigation. One talks here of "cross-sensitivity" of the measurement arrangement. This term signifies that a measurement of the concentration, or a related value, of a particular substance is influenced at a specific wavelength by other components present in the mixture of substances.

The principal object underlying the present invention is thus to provide a simply constructed, reliable arrangement of the initially named kind in which the influence of unwanted components present in the mixture of substances on the desired measured value, for example the concentration of a specific substance, is greately reduced and indeed, so far as is possible, completely eliminated. In addition the noise to signal ratio should be improved with regard to statistical fluctuations.

In order to accomplish this object the invention envisages that (a) a reference spectrum store is provided in which the reference spectrum of the substance or the transformed function thereof is stored, if necessary after modification by a given mathematical operation, (b) the spectrum of the mixture of substances or the transformed function thereof is detected by at least one detector, if necessary after modification by a given mathematical operation, (c) the mean value of at least one of the signals from the store or the detector is suppressed e.g. by a mean value suppression stage, (d) the outputs of the store and of the detector, or of the mean value suppression stages are connected to a controlled transfer stage, if required via modification stages and indeed with (e) the output of the store or the mean value suppression stage for the reference spectrum being connected to the controlling input and (f) the output of the detector or the mean value suppression stage for the measured spectrum being connected to the controlled input of the transfer stage, and in that (g) at least one integrator is connected to the transfer stage, if necessary via a modification stage to integrate the output value from the transfer stage with respect to the independent variable of the spectrum with the output of the integrator representing the concentration or the intensity of the spectrum.

The invention thus makes use of a reference spectrum corresponding to the spectrum of the substance the concentration of which is to be determined in order to substantially reduce the cross-sensitivity of the arrangement. In this connection the controlled transfer stage, which is preferably constructed as a multiplier and which systematically changes the wanted signal in such a way that signal values are obtained which only lie on one side of the zero line, for example positive signal values, is of particular importance. As the association between the stored, wanted signal and the unwanted components which are present in the mixture of substances is purely statistical the combination of the wanted signal with the individual unwanted signal components results in a function which fluctuates statistically about zero and the integral of which correspondingly fluctuates about zero. In contrast the integral of the wanted signal as processed by the transfer stage continuously increases. By selecting a sufficiently large wavelength for the integration the measured value at the output of the arrangement relating to the substance the concentration of which is to be determined can thus be made very large whereas the corresponding unwanted value fluctuates around zero. The influence of the unwanted value is thus considerably reduced.

The output signal of the integrator can be connected to a further processing device or to a display device which can, for example, be calibrated directly in concentration values of the substance under investigation.

The controlled transfer stage can also be a logical AND gate or a controlled switch.

The store is usefully either an electronic or an optical memory. In other words the spectrum of the substance the concentration of which is to be determined can be stored, by way of example, on a film.

It is however also possible for the store to be a test cell containing only the substance under investigation and to include a spectrometer which measures the spectrum of the substance. The mean value suppression stages are preferably single or multiple differentiation stages. In the simplest case it suffices to carry out a simple differentiation of the measured or reference spectra.

As the integral of the unwanted component fluctuates around zero it is possible to completely preclude the influence of the unwanted components by using limits of integration such that the integral of the unwanted components is almost zero.

In the simplest case two limits of integration are provided in the integrator and usefully lie at the ends of a wavelength range with a large wanted signal so that the integral of the wanted signal assumes as large a value as possible.

It is preferably arranged for the first limit of integration to be such that the wanted input signal is relatively small prior to reaching the first limit of integration and that the integral of the product of the unwanted components signals and the reference signal has a zero passage at the second limit of integration.

If several unwanted components are present in the mixture of substances two further limits of integration should be provided in the integrator which usefully lie in a range with a large wanted signal approximately symmetrically to a zero passage of the integral of the product of the first unwanted component signal with the reference signal. In order to refine the measurement arrangement further limits of integration can be provided in the range of integration.

It is of particular advantage, in determining the limits of integration, if a switch which is alternately closed and opened between sequential limits of integration is arranged in front of the integrator. In this arrangement the switch can be controlled from a bistable flip-flop stage which is activated via an OR gate by wavelength threshold value transducers with n+1 wavelength threshold value transducers being provided for n unwanted components.

This formula holds when the first limit of integration has already been determined by means, e.g. by considering the spectrum from the monochromator and selecting an appropriate value.

The wavelength threshold value transducers usefully have an adjustable threshold stage and a differentiation stage and potentiometers can be connected to the threshold value stages.

A particularly useful method of determining the limits of integration in an arrangement of this kind consists, in accordance with the invention, in the steps of introducing test cells, each containing one of the unwanted components, one after the other into the measurement beam path and adjusting the threshold wavelengths via the adjustable threshold value stages or the potentiometers until the output signal of the integrator no longer changes when the test cells are removed.

Figure 2:
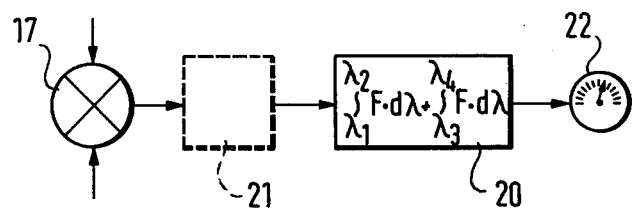
Figure 3:
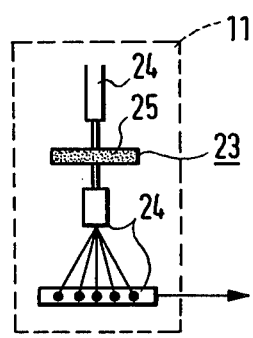
Figure 4:
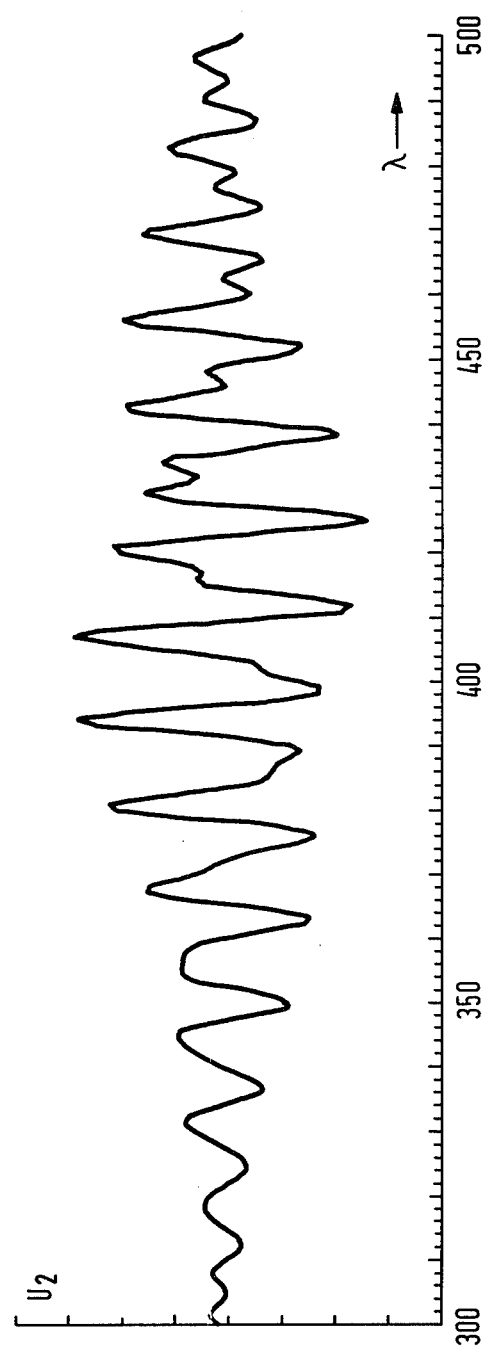
Figure 7:
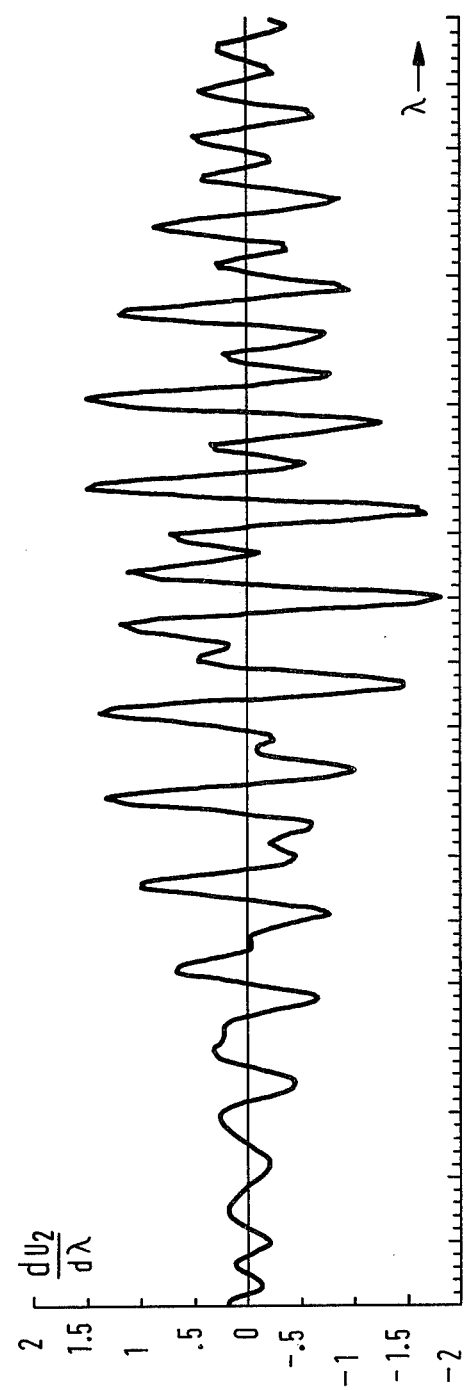
Figure 10:
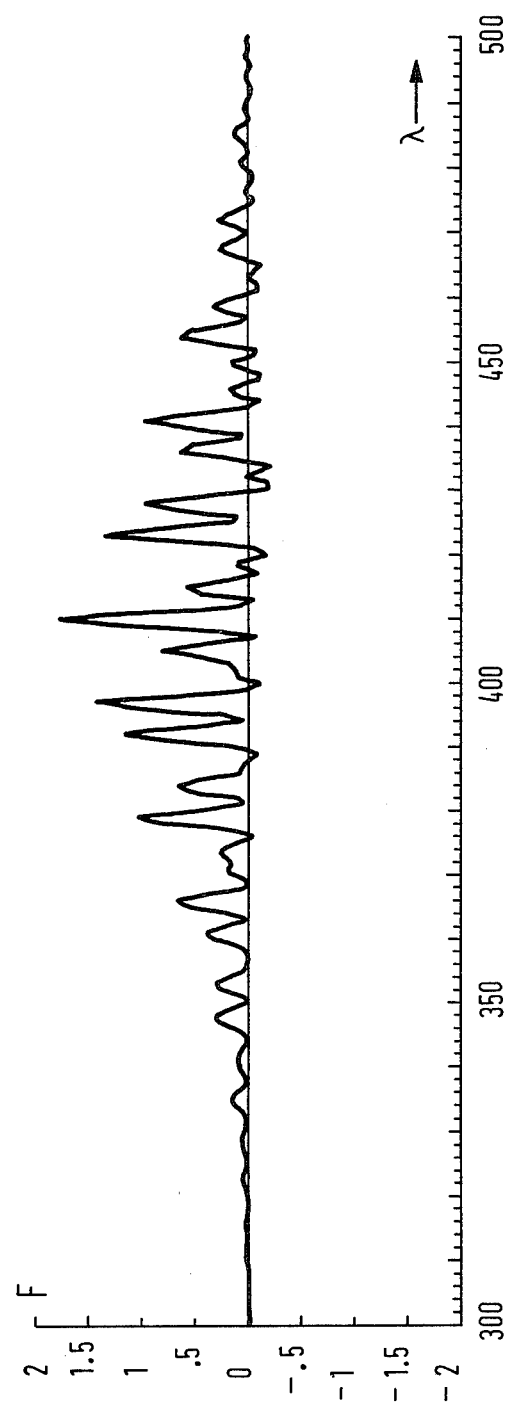
Figure 13:
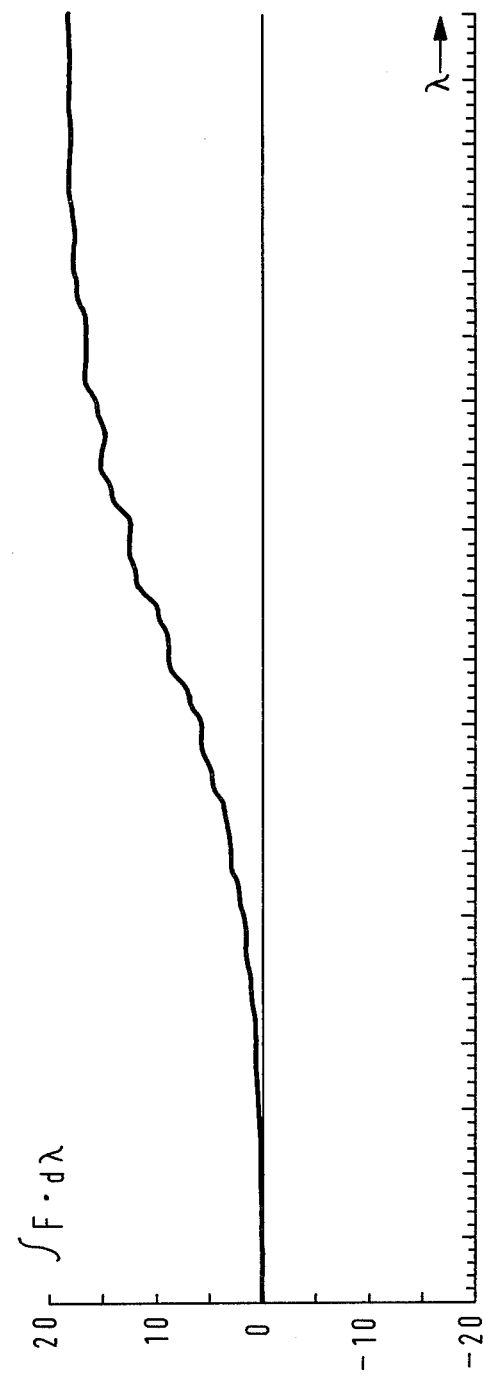
Figure 14:
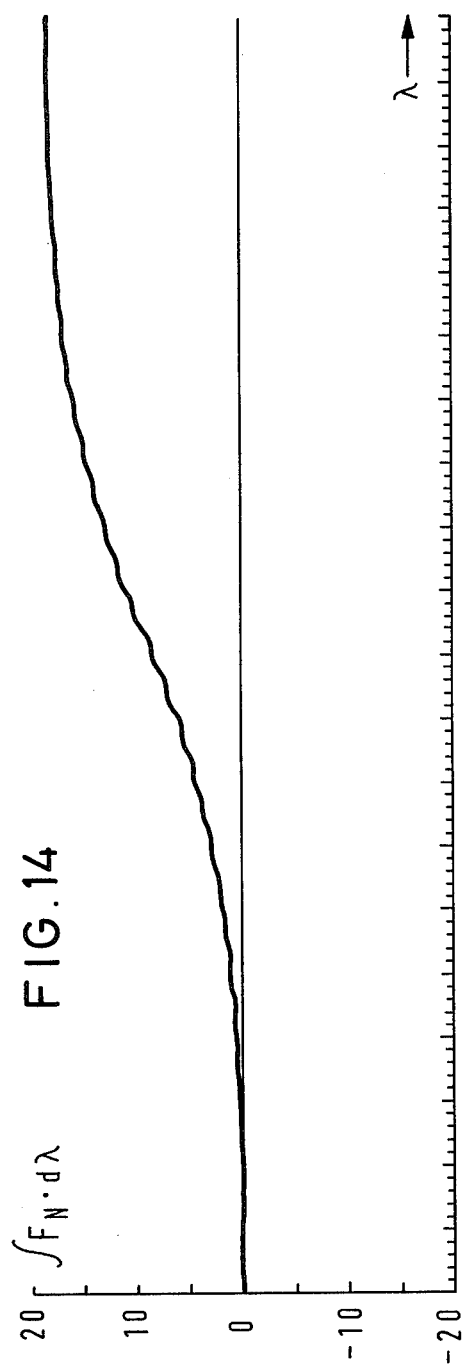
Figure 15:
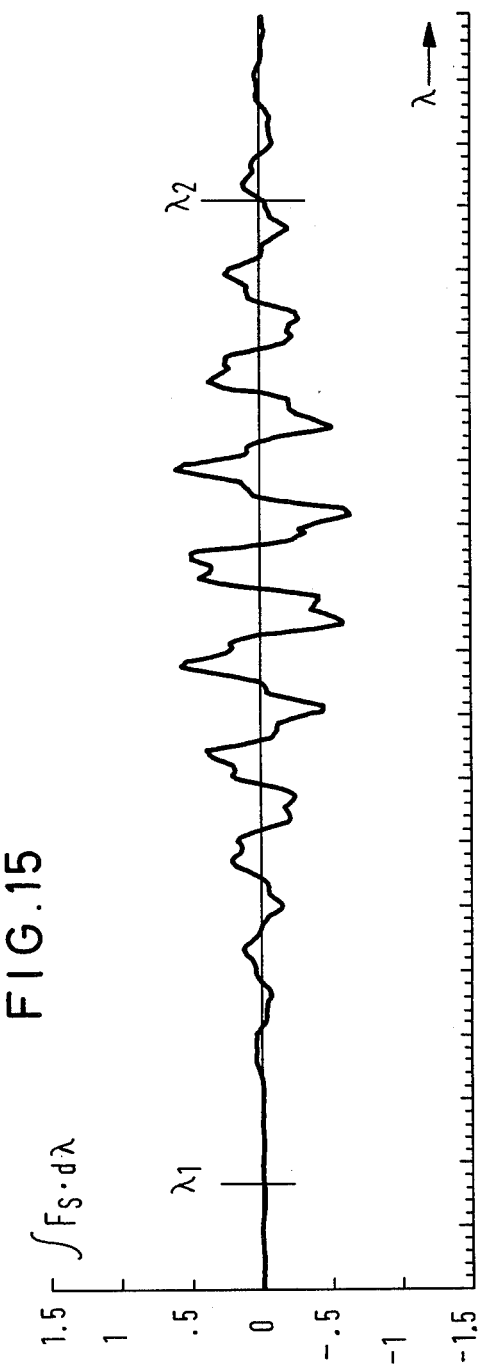
Figure 16:
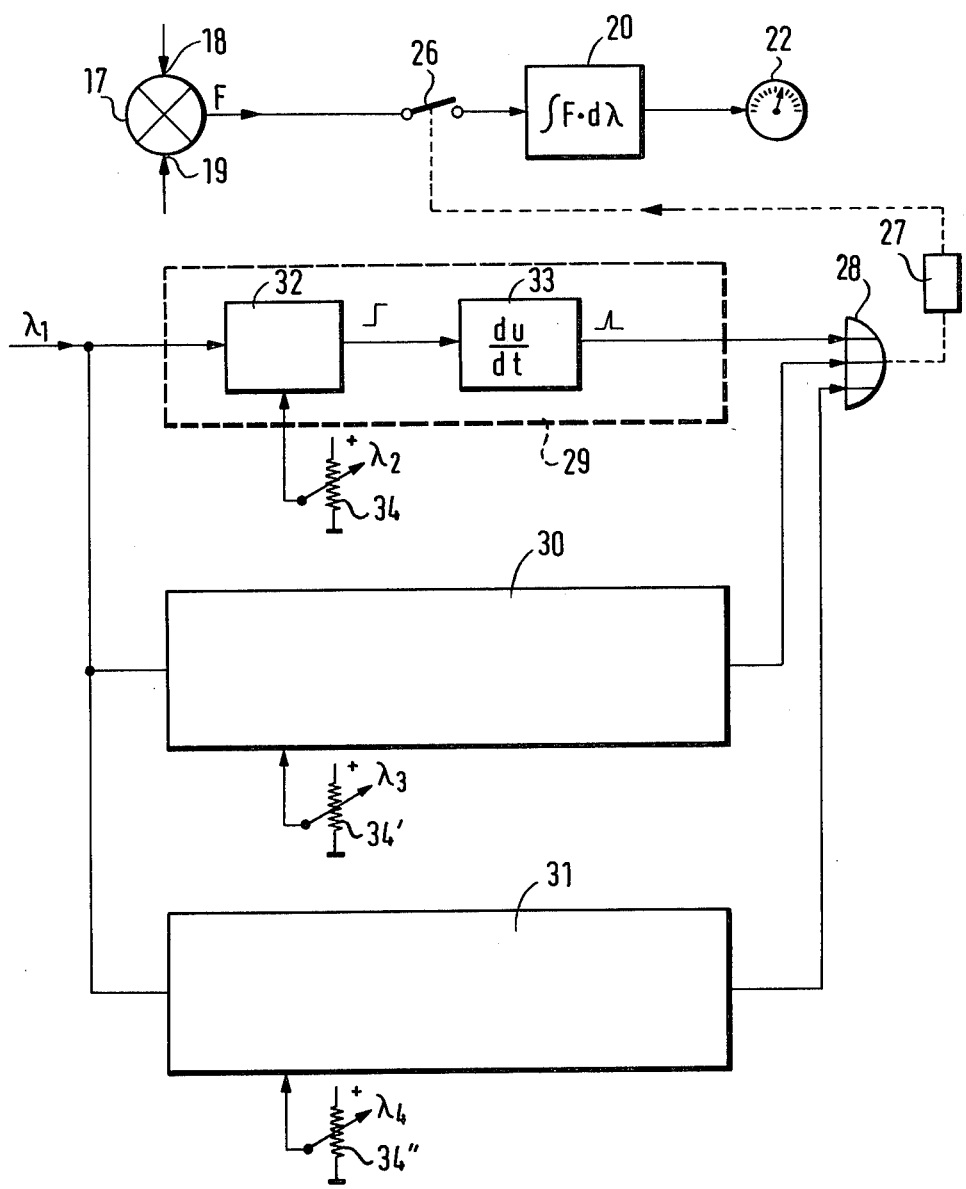
Figure 17:
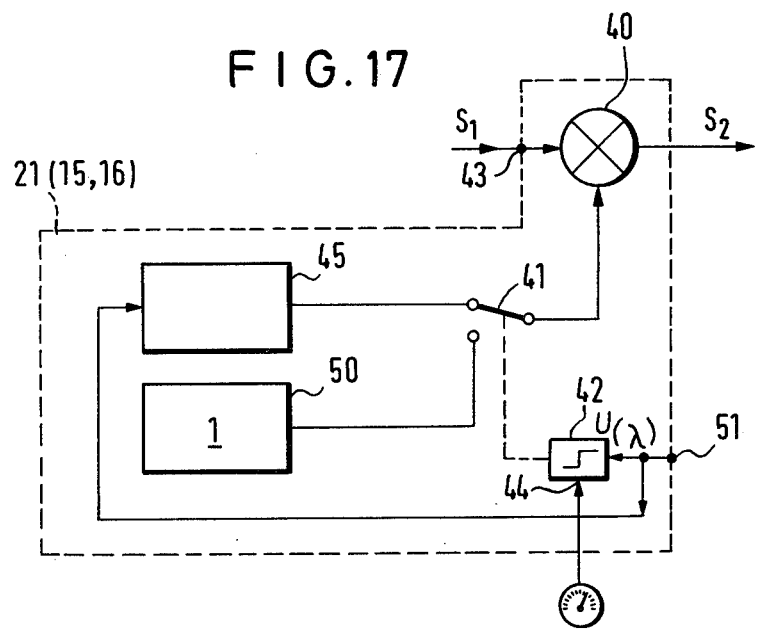
Figure 19:
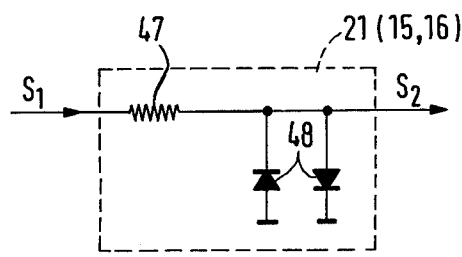
Figure 18:
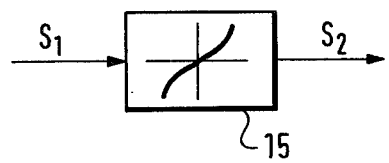
Figure 20:
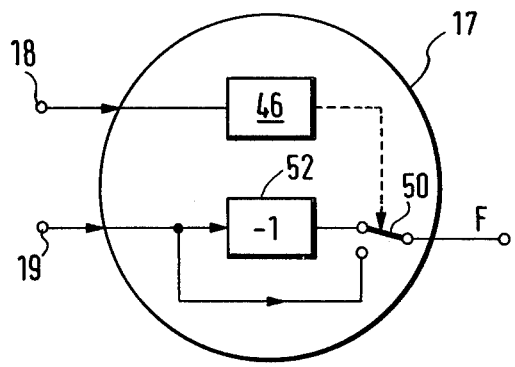
Figure 21:
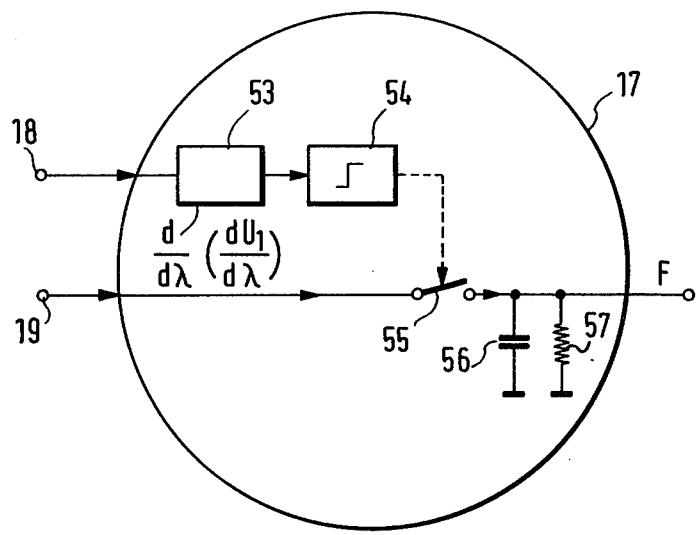
Figure 22:
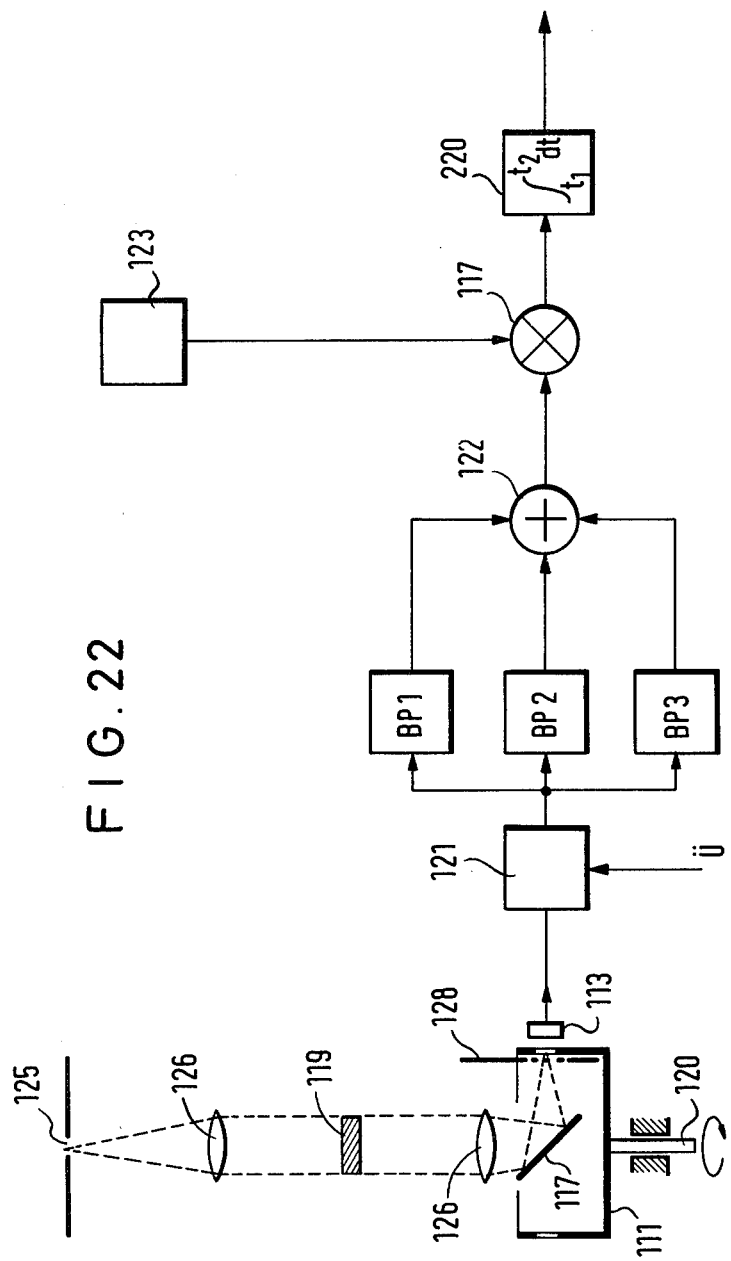

The invention will now be described in further detail by way of example only and with reference to the accompanying drawings in which are shown:

FIG. 1—a schematic block circuit diagram showing the principles of an arrangement for spectral analysis in accordance with the invention, FIG. 2—a modification of an integration stage incorporated in the arrangement of FIG. 1, FIG. 3—a schematic block illustration of a special construction of a store as used in the arrangements of FIGS. 1 and 2, FIG. 4—a diagram of intensity versus wavelength for the measured spectrum which will also be called the measurement signal in the following, FIG. 5—the wanted spectrum contained in FIG. 4 of the substance the concentration of which is to be determined, this wanted spectrum will be termed the wanted signal in the following, FIG. 6—a diagram of intensity versus wavelength for the unwanted spectrum contained in FIG. 4 of a further substance contained in the mixture of substances in addition to the substance under investigation, the spectrum shown in FIG. 6 will be termed the unwanted signal in the following, FIG. 7—the derivative of the measured signal of FIG. 4, FIG. 8—the derivative of the wanted signal of FIG. 5, FIG. 9—the derivative of the unwanted signal of FIG. 6, FIG. 10—the product of the differentiated measurement signal of FIG. 7 and the differentiated and stored wanted signal which follows the curve shown in FIG. 8, FIG. 11—the product of the wanted signal contained in the differentiated measurement signal of FIG. 8 and the differentiated stored wanted signal which also follows the curve shown in FIG. 8 but is of different amplitude, FIG. 12—the product of the differentiated stored wanted signal which follows the curve of FIG. 8 and the differentiated unwanted signal of FIG. 9, FIG. 13—the integral of the function of FIG. 10, FIG. 14—the integral of the product signal of FIG. 11, FIG. 15—the integral of the product illustrated in FIG. 12 of the differentiated stored wanted signal and the differentiated unwanted signal, FIG. 16—a schematic block diagram of a comparison device for the limits of integration, FIGS. 17-19—block diagrams of three different embodiments of a modification stage, FIGS. 20,21—special embodiments of a controlled transfer stage, FIG. 22—an embodiment which uses a spectral analyser as shown in DE-OS No. 30 14 646, and FIGS. 23 to 27—an example showing an ideal way of specifying four limits of integration when two unwanted components are present.

As seen in FIG. 1 the arrangement of the invention has a store or memory 11 in which the reference spectrum illustrated in FIG. 5 of a particular gas, or a particular liquid, or a particular solid is stored. The store 11 is connected to a differentiation stage 13 which differentiates with respect to wavelength and forms the differentiated wanted signal of FIG. 8 from the wanted signal of FIG. 5. A modification stage 15 can be connected to the differentiation stage 13. The output signal of the differentiation stage 13, which, if necessary, is led through the modification stage 15, is finally fed to one input 18 of a controlled transfer stage 17 which takes the form of a multiplier in the present embodiment.

As seen in FIG. 3 the store 11 can include a spectrometer 24 in which is arranged a test cell 23 which contains (in pure form, i.e. free from any form of additive) the substance 25 the concentration of which is to be determined. The spectrometer 24 thus forms as its output a spectrum as illustrated in FIG. 5.

A detector 12 is arranged at the measurement section which contains the mixture of substances and forms at its output over a predetermined range of wavelength, a measured spectrum which is illustrated in FIG. 4 and which contains a wanted signal or wanted spectrum in accordance with FIG. 5 in respect of the substance the concentration of which is to be determined and an unwanted spectrum or unwanted signal in accordance with FIG. 6 in respect of an unwanted component present in the measurement section. This measured spectrum is likewise passed via a differentiation stage 14 which differentiates with respect to wavelength and, if required, a further modification stage 16 to the controlled transfer stage 17.

FIG. 7 shows the derivative of the measured spectrum as a function of wavelength. This derivative is the sum of the derivative of the wanted signal of FIG. 8 and the derivative of the unwanted signal of FIG. 9.

The output signal F of the multiplier 17 is passed, if required, after passage through a further modification stage 21, to an integrator 20. A display device 22 calibrated in terms of the concentration of the substance under investigation is located at the output of the integrator 20.

The output signal F of the multiplier 17 is illustrated in FIG. 10 whereas FIGS. 11 and 12 show the wanted and unwanted components $F_N$ and $F_S$ which are contained therein and which are related to the signal F as follows:

$$F = F_N + F_S$$

The sum of the functions of FIGS. 11 and 12 thus represent the output signal F as shown in FIG. 10 of the multiplier 17.

It can be seen from FIG. 11 that the wanted signal product $F_N$ only extends above the zero line, and is thus positive throughout, as a result of the combination of the reference and measured signals in accordance with the invention. In contrast the unwanted signal product $F_S$ fluctuates statistically around the zero line as shown in FIG. 12.

In this manner the integral represented in FIG. 14 of the wanted signal product $F_N$ with respect to wavelength continuously increases whereas the integral shown in FIG. 15 of the unwanted signal product $F_S$ of FIG. 12 with respect to wavelength fluctuates around the zero line. As shown in FIG. 13 the integral of the total signal F of the multiplier 17 thus continuously increases. The relative faults brought about by the unwanted signal become smaller as the length of the integration increases.

Attention should be paid to the different scales of the ordinates of FIGS. 14 and 15.

It can be seen that the integral of the wanted signal product $F_N$ rises to approximately 20 whereas the maximum excursions of the integral of the unwanted signal product $F_S$ with respect to wavelength as shown in FIG. 15 never quite reach the value 1.

Integration is now carried out, in accordance with the invention, up to the wavelength at which the integral of FIG. 14 as reached approximately its highest value. It will be seen that at this point the integral is distorted by the unwanted signal by a maximum amount which is less than 5%. If the integration is started as indicated in FIG. 15, at a wavelength $\lambda_1$ where the unwanted signal is usefully zero and carried out up to a wavelength $\lambda_2$ where the integral of the unwanted signal has a zero passage then the output signal of the integrator 20 will not be distorted at all by the unwanted component.

The first limit of integration $\lambda_1$, i.e. the left hand limit of integration in FIG. 15 is positioned in accordance with the invention at the edge of a region which has a large wanted signal.

The second limit of integration $\lambda_2$ is positioned in accordance with FIG. 15 in such a way that the measurement signal on the right hand side of the integration limit is relatively small and in such a way that the integral of the product for the first unwanted signal with the reference signal has a zero passage at the limit of integration.

As a rule the corresponding integral for a second unwanted signal that may be present will not have a zero passage at this point. Because of this two further limits of integration $\lambda_3$ and $\lambda_4$ can be provided for the integrator 20 in accordance with FIG. 2. These limits of integration $\lambda_3$, $\lambda_4$ are preferably disposed approximately symmetrically about a zero passage of the product of the first unwanted signal with the reference signal as is indicated in FIG. 12. As seen in FIG. 23 which is similar to FIG. 15 the integral of the product of the first unwanted signal with the reference signal then remains unchanged between the two new integration limits $\lambda_3$, $\lambda_4$. In corresponding manner the zero passage at the second limit of integration $\lambda_2$ is also not influenced.

Figure 25:
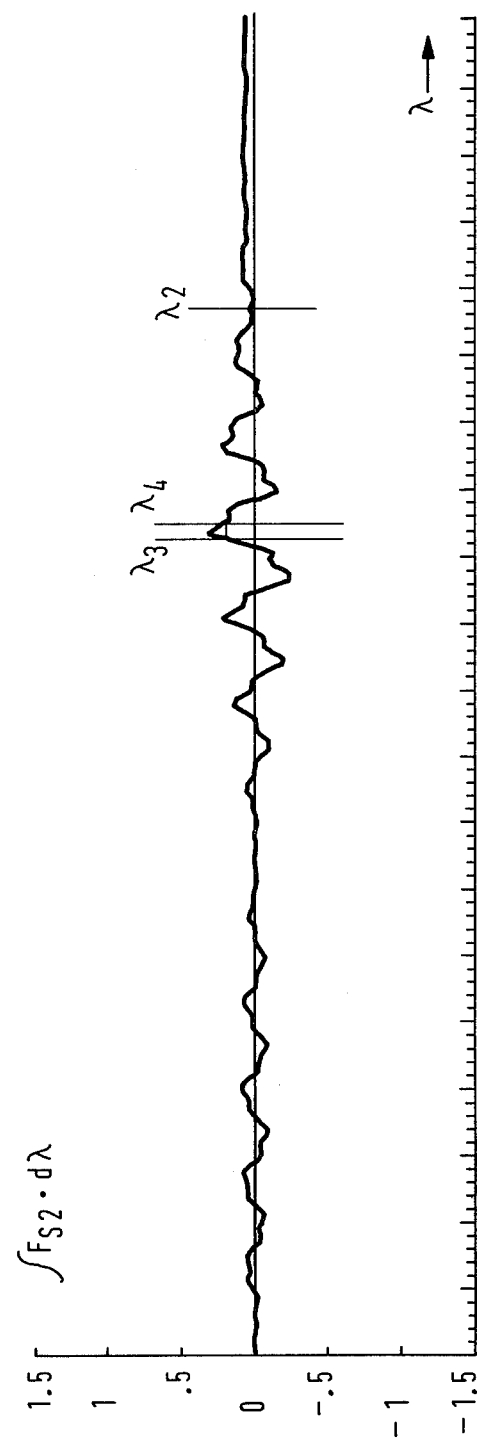

In contrast the integral of the product of the second unwanted signal with the reference signal is so influenced by correct choice of the additional limits of integration that this integral also goes to zero at the second limit of integration $\lambda_2$ (FIG. 25).

The signal $U_{22}$ of the second unwanted component and also the differentiated signal $dU_{22}/d\lambda$ derived therefrom are shown in FIGS. 26 and 27. The product of the second unwanted signal with the reference signal is shown in FIG. 24.

It is expedient if several unwanted components are present, to operate in the same sense in accordance with the invention with further non-related ranges of integration. With n limits of integration it is possible to remove the cross-sensitivity produced by $n-1$ substances.

FIG. 16 shows an embodiment which can for example be used to determine the limits of integration for a gas mixture consisting of three gases. The same reference numerals are used in each case to identify components which have counterparts in the proceeding figures.

As seen in FIG. 16 a switch 26 which can be alternately opened or closed by a bistable flip-flop stage 27 is inserted between the multiplier 17 and the integrator 20.

The bistable flip-flop stage 27 is connected to an OR gate 28. The OR gate 28 has three inputs which are connected to the outputs of three wavelength threshold value transducers 29, 30 and 31. The internal construction of each of the threshold value transducers is in each case the same and is illustrated only for the example of the threshold value transducer 29.

The input quantity for the three wavelength threshold value transducers 29, 30, 31 is a voltage which is proportional to the wavelength being processed by the store 11 or the detector 12. Each threshold value transducer has first of all a threshold value stage 32 the threshold value of which can be changed by a respective one of the adjustable potentiometers 34,34',34". Differentiation stages such as 33 form pulses from the step pulses emitted by the threshold stages 32. The pulses formed by the differentiation stages 33 each act to switch the bistable flip-flop stage 27 via the OR gate 28 from one of its states into the other of its states.

At the start of the integration over the range of wavelength the switch 26 is closed. This lowest wavelength of the integration range is designated with $\lambda_1$, i.e. the first limit of integration. The further limits of integration $\lambda_2$, $\lambda_3$ and $\lambda_4$ are then respectively set at the potentiometers 34, 34' and 34" respectively.

In practice this can be carried out by introducing two test cells which respectively contain the two unwanted components, one after the other into the path of the measurement beam. The potentiometers 34, 34', 34" are now adjusted until no change of the display of the display device 22 can be found on moving each test cell into the beam path or on removing each test cell from the beam path. The cross-sensitivity with respect to the two unwanted components has then been completely removed.

FIGS. 17, 18 and 19 show various practical embodiments for the construction of the modification stages 15, 16, 21 which will now be described in detail:

In the modification stages, preferably in the modification stage 21, the input signal at 43 is multiplied by a wavelength dependent weighting function. In this way it is possible to emphasize spectral ranges with a favourable ratio between the unwanted and wanted signals (noise to signal ratio) when compared with spectral ranges where this ratio is unfavourable. The most important aspect of the weighting function is however that one can thereby generate a continually increasing attenuation of the signal at the limits of integration rather than an abrupt termination of the integration at the limits of integration. In the case of limits of integration with continuously increasing attenuation relatively large wavelength errors can be tolerated by the arrangement without the output signal being unacceptably falsified.

In the modification stages 21, 15 and 16 of FIG. 17 the signal $S_1$ which is applied to the input 43 and which comes from the preceding stages 17, 13 or 14 respectively is passed to the input of a multiplier 40 which should not be confused with the multiplier 17. By way of example it is assumed that a limit of integration is present at $L_2$ at the long wavelength end of the range of integration and that the spectrum is being analysed in the direction from shorter to longer wavelength. In this case, in accordance with the invention, a switch 41 which is controlled by a threshold value detector 42 to which a wavelength signal $u(\lambda)$ is applied and which lies at the other input of the multiplier 40, is held at wavelengths smaller than $\lambda_1$ in the lowermost position where it is connected to a device 50 which supplies the factor 1. Thus a control signal with the relative value 1 reaches the second input of the multiplier 40 i.e. the signal $S_1$ is not modified and the output signal $S_2$ is the same as the input signal $S_1$.

At the wavelength $\lambda_2$ the wavelength signal $u(\lambda)$ exceeds the threshold provided in the threshold detector 42 and switches the switch 41 into the upper position. The wavelength signal $u(\lambda)$ at the input 51 rises continuously with wavelength. By adjusting the size of a fixed reference signal at the input 44 of the threshold value detector 42 it is possible to preselect the wavelength at which the switch 41 changes over. When the switch 41 changes over into the upper position a transfer stage 45 to which the wavelength signal $u(\lambda)$ is likewise supplied from the input 51, is connected to the second input of the multiplier 40. The transfer stage 45 contains the weighting function. The output signal of the transfer stage 45 is now multiplied by the signal $S_1$ and transformed into the signal $S_2$. The weighting function of the transfer stage 45 is a function which continuously reduces over a relatively small wavelength range (for example 5% of the whole range of measurement). The weighting function is in particular the function $$f \exp (\lambda_1 - \lambda_2/a)$$

where a is a constant which determines the steepness of the function.

Apart from wavelength dependent weighting functions one can also use amplitude dependent weighting functions. FIG. 18 shows an example. Such amplitude dependent weighting functions are particularly advantageous if they are used for the modification stage 15 of FIG. 1 and if a non-linear power function, for example $S_2 = b \cdot S_1^3$ is used. With this arrangement strong spectral lines are given more weight in the evaluation than weak spectral lines, b is a constant.

Another advantageous function for the modification stage is the directional or sign function. I.e. only the sign of the measurement signal and/or the stored reference signal is evaluated. The main advantage of the directional function is that significantly less storage capacity is required to store it than for the spectral function from which it is derived. FIG. 19 shows a modification stage which can be used to derive the directional function $S_2$ from the input function $S_1$. For this purpose the signal $S_1$ is limited by a resistor 47 and two oppositely poled threshold diodes 48.

It is fundamentally also possible to use other weighting functions in the modification stages 15, 16, 21.

The signals $U_1(\lambda)$, $U_2(\lambda)$ are, in accordance with the invention differentiated (FIGS. 1, 7 to 9) so that their mean value is zero. It is not necessary to carry out an accurate differentiation in order to achieve this goal. It is in particular sufficient to transfer the signal via a coupling capacitor.

The differentiation stages 13, 14 can be omitted if the detector already delivers a mean value free signal. Pyroelectric detectors have for example this characteristic.

It is sufficient if one of the two signals which reach the inputs 18, 19 is mean value free because the product of a mean value free signal with a signal having a mean value is a mean value free signal.

FIG. 20 shows a controlled transfer stage 17 with a controlled switch 50, in particular an electronic switch, which is controlled by a threshold value detector 46 which is fed from the input 18.

When the signals at the input 18 are positive the switch 50 is in the lower position. When the signals at the input 18 are negative the switch 50 is in the upper position. In this arrangement the wanted signal components of the measured signal also always make a positive contribution to the output signal F and the unwanted signal components produce an output signal $F_S$ which fluctuates around zero.

A further embodiment for the controlled transfer stage 17 with the transfer function of a controlled detector member is shown in FIG. 21. The signal arriving at the input 18 is once again differentiated in a differentiating stage 53. A subsequent threshold detector 54 delivers a signal for negative input pulses which closes a switch 55 inserted between the input 19 and the output for a short period of time. The signal present at the input 19 at this time is stored in a subsequent capacitor 56 which delivers the output signal F until it has discharged via a resistor 57 which is connected in parallel. The controlled transfer stage 17 of FIG. 21 has the characteristic that the switch is always closed at the maximum of the wanted signal components and that in contrast the times at which signals are drawn from the unwanted signal components are randomly distributed relative to their maxima.

Instead of storing the spectral function it is also possible, in the arrangement of FIG. 1, to store the mean value free signal, i.e. the signal after the stage 13 and, if necessary, indeed even the signal after the stage 15. In this case the stages 13 and 15 can be omitted during signal processing.

In order to increase the density of information it is possible to use derivatives of various orders, for example the first and second order from the spectrum. These various derived functions are then either added prior to the controlled transfer stage 17 or each passed to a respective controlled transfer stage 17 with the signals being added before or after the integrator. This is an example of the fact that in general the signals can be broken up into components which can then be individually processed in accordance with the invention.

It has hitherto been assumed that the input signal of the arrangement is delivered from a monochromator and is directly proportional to the intensity of the optical radiation of the emitting object or proportional to the extinction of the absorbing substance. In place of this however it is possible to transform the primary spectrum by optical means. An example of this is the arrangement described in my earlier application U.S. Ser. No. 253,357 (which claims priority from DE-OS No. 30 14 646) the disclosure of which is hereby incorporated in this application. In this arrangement the primary spectrum of the monochromator is transformed by means of a modulator with a time dependent modulation frequency into a secondary spectrum. A further example is the Fourier spectrometer. A yet further example is the spectrometer described in the copending German patent application No. P 30 45 156.0.

In combining the arrangement of DE-OS No. 30 14 646 with the presently described invention the entire electrical spectrum of the input signal of the signal processing arrangement is multiplied, as shown in FIG. 22, with the likewise transformed and stored spectrum. All frequencies are thus simultaneously processed. The product is time averaged. The range limits of the band pass filter correspond to the limits of integration of the previously described arrangements. Non-related ranges of integration are realized in FIG. 22 by band pass filters BP1, BP2, BP3 which are arranged in parallel and have different transmission ranges.

The left part of FIG. 22 corresponds to FIG. 3 of DE-OS No. 30 14 646. In this arrangement a slot 125 which is illuminated from behind by the radiation which is to be analysed is imaged on the cylindrical surface of a chopper drum 111 via lenses 126, a dispersion member 119 which can be a grating or a prism disposed between the lenses 126 and a deflecting mirror 117 arranged inside the chopper drum 111. A wavelength stop 128 can be arranged in front of the chopper drum. A modulation structure such as is described in DE-OS No. 30 14 646 is provided in the surface of the chopper drum 111. A detector 113 is arranged behind the modulation structure. When the chopper drum 111 rotates about its rotational axis 120 with constant speed a light beam which falls on the cylindrical peripheral wall of the chopper drum 111 is modulated with a temporally varying frequency. After one rotation of the chopper drum the frequency springs back to its initial value. As the detector 113 extends over the whole peripheral length of the modulation structure provided in the wall of the drum 111 it receives a signal mixture. After mixing in the mixing stage 121 with the signal U coming from a reference chopper drum (FIGS. 9, 10 of DE-OS No. 30 14 646) the signal mixture reaches the parallel band pass filters BP1, BP2, BP3 the transmission limits of which determine the limits of integration. The transmitted signals are subsequently added in a summing stage 122. The summed signal is then multiplied by means of a multiplication stage 117 with a signal which corresponds to a reference spectrum and which is stored in a memory 123. The product is finally passed to the integrator 220 and integrated between the times $t_1$, $t_2$. The independent variable in this embodiment is thus not the wavelength $\lambda$ or the frequency because, by virtue of the transformation that is used, all the wavelengths can simultaneously play a roll in forming the output signal. Instead the independent variable with respect to which the integration is carried out is time with the times $t_1$, $t_2$ being the times at which the chopper drum 111 adopts two predetermined positions in the course of its rotational movement. As a rule these will be the initial and end positions of the chopper drum 111 during one pass of the modulation structure.

In accordance with the invention as many substances as desired can be analysed by retaining the spectra of several substances uninfluenced by unwanted components in different stores 11. When the ratio of the components of the mixture of substances is constant it is also possible to carry out analysis of the mixture of substances.

In so far as trivial cross-sensitivities remain when using the arrangement of the invention these can also be removed using other methods or via systems of equations.

Furthermore ambiguous spectra (for example the mixture of spectra of different orders from grating spectrometers) can be analysed by means of the arrangement of the invention. It can indeed be advantageous to superimpose the spectra of different spectral ranges in order to thereby enlarge the density of information.

I claim:

1. Apparatus for the generation of a detectable signal related to the concentration of a preselected substance in a mixture of substances from a comparison of the optical spectrum of said mixture over an independent variable with a reference spectrum, said apparatus comprising:

means for storing said reference spectrum or a transformed function thereof, and for generating a signal related thereto, a detector adapted to detect the optical spectrum of said mixture or a transformed function thereof, means for suppressing the mean value of at least one of the signals generated by said storing means and said detector, a controlled transfer stage containing a controlling input, a controlled input and an output, said controlling input adapted to receive the signal generated by said storing means and said controlled input adapted to receive the signal generated by said detector, and means for integrating the output signal from said controlled transfer stage over said independent variable.

2. Apparatus in accordance with claim 1 in which the output of said controlled transfer stage comprises (a) a function which has only one sign and is related to the combination of the signal generated by said storing means after mean value suppression thereof and the portion of the signal generated by said detector related to said preselected substance, and (b) a function which on average fluctuates around zero and is related to the combination of the signal generated by said storing means after mean value suppression thereof and the portion of the signal generated by said detector related to substances within said mixture other than said preselected substance.

3. Apparatus in accordance with claim 1 further comprising a member connected to the output of said integrating means selected from a signal processing circuit and a display device.

4. Apparatus in accordance with claim 1 in which said controlled transfer stage is a multiplier.

5. Apparatus in accordance with claim 1 in which said controlled transfer stage has the transfer function of a logical AND-gate.

6. Apparatus in accordance with claim 1 in which said controlled transfer stage has the transfer function of a controlled switch.

7. Apparatus in accordance with claim 6 in which said controlled switch switches over between two transfer factors which are of the same size but have opposite signs.

8. Apparatus in accordance with claim 1 in which said storing means is an electronic memory.

9. Apparatus in accordance with claim 1 in which said storing means is a spectrometer.

10. Apparatus in accordance with claim 1 in which said storing means is an optical memory.

11. Apparatus in accordance with claim 1 in which said suppressing means are single or multiple differentiation stages.

12. Apparatus in accordance with claims 1, 2, 3, 4, 5, 6, 7, 8, 9, 10, or 11 in which said independent variable in said integrating means extends between predetermined limits whereby the integral of the portion of the signal related to substances within said mixture other than said preselected substance is approximately zero.

13. Apparatus in accordance with claim 1 in which said integrating means has first and second integration limits.

14. Apparatus in accordance with claim 13 in which said integration limits define a wavelength range containing a substantial portion of the signal related to said preselected substance.

15. Apparatus in accordance with claim 13 in which said second integration limit is selected to produce a wavelength range over which the combined integral of said reference signal and the portion of the signal related to substances within said mixture other than said preselected substance is approximately zero.

16. Apparatus in accordance with claim 1 in which said integrating means has first, second, third, and fourth integration limits.

17. Apparatus in accordance with claim 16 in which said third and fourth limits are located within the range of the portion of the signal related to said preselected substance and are arranged symmetrically about a point at which the combined integral of said reference signal and the portion of the signal related to substances within said mixture other than said preselected substance passes through zero.

18. Apparatus in accordance with claim 1 in which said integrating means has more than four limits of integration.

19. Apparatus in accordance with claim 1 in which said integrating means contain a switch which is alternately opened and closed whereby sequential limits of integration are defined.

20. Apparatus in accordance with claim 19 in which said switch is controlled by a bistable flip-flop stage which is activated via on OR-gate by wavelength threshold transducers with n+1 wavelength threshold transducers being provided for n unwanted components.

21. Apparatus in accordance with claim 20 in which each said wavelength threshold transducer has an adjustable threshold stage and a differentiation stage.

22. Apparatus in accordance with claim 21 further comprising a potentiometer connected to each of said threshold value stages.

23. Apparatus in accordance with claim 1 further comprising means for modifying said input signals in accordance with a weighting function which accentuates signals from preselected spectral regions in preference over signals from other spectral regions on the basis of the ratio of the wanted to unwanted signals.

24. Apparatus in accordance with claim 1 further comprising means for modifying the input signal in accordance with a directional function which provides a continuously rising attenuation of the signal at the limits of integration.

25. Apparatus in accordance with claim 1 in which said storing means further stores the sign function of either said reference spectrum or said transformed function thereof.

26. Apparatus in accordance with claim 1 further comprising means for transforming said reference spectrum and said spectrum of said mixture to spectra with a variable other than wavelength as the independent variable.

27. Apparatus in accordance with claim 26 in which said transforming means comprises means for performing a Fourier transform.

28. A method of determining the integration limits in the apparatus of claim 22 which comprises placing a series of test cells, each containing one of the substances in said mixture other than said predetermined substance, in the measurement beam path of said detector in sequence, and adjusting either said threshold value stages or said potentiometers relative to the wavelength to produce and integrator output signal which remains constant upon removal of each said test cell.

* * * * *